US009785880B2

(12) United States Patent
Kurian

(10) Patent No.: US 9,785,880 B2
(45) Date of Patent: Oct. 10, 2017

(54) RADIO FREQUENCY IDENTIFICATION ACTIVATION

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/934,318

(22) Filed: Nov. 6, 2015

(65) Prior Publication Data

US 2017/0132504 A1   May 11, 2017

(51) Int. Cl.
*H04Q 5/22* (2006.01)
*G06K 19/07* (2006.01)
*G06K 19/067* (2006.01)

(52) U.S. Cl.
CPC ....... *G06K 19/0727* (2013.01); *G06K 19/067* (2013.01); *G06K 19/0723* (2013.01); *G06K 19/0724* (2013.01); *G06K 19/0726* (2013.01)

(58) Field of Classification Search
CPC ............. G06K 19/067; G06K 19/0723; G06K 19/0724; G06K 19/0726
USPC ....................................... 340/10.1, 10.3, 505
See application file for complete search history.

(56) References Cited

U.S. PATENT DOCUMENTS

| | | | | |
|---|---|---|---|---|
| 6,710,700 B1* | 3/2004 | Tatsukawa | ............. | B60R 25/04 340/5.52 |
| 7,576,650 B1* | 8/2009 | Ghaffari | ............. | G05B 19/00 340/539.13 |
| 7,884,724 B2* | 2/2011 | Tuttle | ............. | G01S 13/767 340/539.13 |
| 2005/0109845 A1* | 5/2005 | Ghaffari | ............. | G05B 19/00 235/385 |
| 2005/0253683 A1* | 11/2005 | Lowe | ............. | G06F 21/32 340/5.53 |
| 2006/0158313 A1* | 7/2006 | Satou | ............. | G06K 7/0008 340/10.2 |
| 2006/0187061 A1* | 8/2006 | Colby | ............. | G06K 19/025 340/572.8 |
| 2013/0015955 A1* | 1/2013 | Luong | ............. | G06Q 20/352 340/10.1 |
| 2014/0125459 A1* | 5/2014 | Sabahialshoara | ..... | G01S 13/751 340/10.1 |
| 2014/0196820 A1* | 7/2014 | Gray | ............. | A45C 11/182 150/147 |

(Continued)

*Primary Examiner* — Carlos E Garcia
(74) *Attorney, Agent, or Firm* — Banner & Witcoff, Ltd.; Michael A. Springs

(57) ABSTRACT

Radio frequency identification (RFID) enabled devices are presented. In some examples, a RFID tag may be arranged on the device and the device may further include a RFID tag mode modifier which is configured to transfer the mode or state of the RFID tag from a first mode, such as an inactive mode, to a second mode, such as an active or enabled mode, or vice versa. For instance, the RFID tag mode modifier may transfer the RFID tag from an inactive mode or state to an active mode or state in which the RFID tag may be enabled for use, or vice versa. The RFID tag mode modifier may be an activation button, a contact region, or a physical device configured to prevent transmission of RFID signals. One or more methods of generating or using the devices described herein are also provided.

15 Claims, 10 Drawing Sheets

(56) References Cited

U.S. PATENT DOCUMENTS

2015/0079326 A1* 3/2015 Snow .................. G09F 3/0292
428/42.1

* cited by examiner

RADIO FREQUENCY IDENTIFICATION ACTIVATION

BACKGROUND

Security and privacy of personal information and, in particular, various types of payment information, are important concern for both customers and entities facilitating payments (e.g., credit card companies, financial institutions, and the like). Several types of devices use radio frequency identification (RFID) technology to aid in maintaining the security and privacy of this personal information. However, the RFID tag may be susceptible to unauthorized reading or scanning by unauthorized users if it is in a constant active state or if a RFID reader is within a certain proximity of the device. Accordingly, it would be advantageous to control the state of the RFID tag as an additional measure to maintain the security of personal information.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to a device including a radio frequency identification (RFID) tag. The RFID tag may be arranged on a body portion of the device. The device may further include a RFID tag mode or state modifier which is configured to transfer the mode or state of the RFID tag from a first mode to a second mode, or vice versa. For instance, the RFID tag mode or state modifier may transfer the RFID tag from an inactive mode or state to an active mode or state in which the RFID tag may be enabled for use, or vice versa.

In some examples, the RFID tag mode or state modifier may include an activation button, such as a toggle switch. Selection of the activation button may transfer the RFID tag from a current mode or state (e.g., a first mode) to a second mode or state. Subsequent selection of the activation button may return the RFID tag to the first state.

In other examples, the RFID tag mode or state modifier may include a contact region arranged on the body portion of the device. The contact region may receive user input contacting the region for a predetermined amount of time and may then transfer the RFID tag from a first mode or state to a second mode or state, or vice versa. In some examples, biometric data may be collected via the contact region and compared to pre-stored biometric data of one or more authorized users to determine whether the user contacting the region is an authorized user.

In some arrangements, the RFID tag mode or state modifier may include an additional device or portion of the device configured to block or prevent transmission of a RFID signal. For instance, the device may include a flap formed of a material to prevent transmission of the RFID signal. The flap may be connected to the device and may overlay the RFID tag to prevent signal transmission in an inactive mode or state, and may be pulled back to expose the RFID tag when an active mode or state is desired.

In other examples, the device itself may be configured to fold inward, onto itself. The device may be formed of a material configured to prevent transmission of RFID signals and, as such, when folded, the RFID tag may be enclosed by the device, thereby preventing transmission of signals. When the device is in an open configuration, the RFID tag may be exposed and thereby active and enabled for use.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, various types of devices may use radio frequency identification (RFID) or other similar types of technologies to make payment, provide access to one or more areas, or the like. However, conventional RFID tags are available to be scanned or read at any time. That is, a RFID scanner within a certain proximity of the device having the RFID tag may be able to obtain information via the RFID tag without a user's knowledge or in an unauthorized manner. For active RFID tags, a scanner may read information from even greater distances. Accordingly, this may put a user's information (e.g., personal information, payment information, or the like) at risk for unauthorized access.

One or more aspects described herein are related to devices using RFID technology that include a RFID tag mode or state modifier. The RFID tag mode or state modifier may transfer the RFID tag on the device from a first mode to a second mode, or vice versa. For instance, if the RFID tag is in an inactive mode in which signals are encoded, blocked or otherwise prevented from being transmitted or received, the RFID tag mode or state modifier may be used to transfer the RFID tag to a second mode, such as an active mode in which decrypted signals may be transmitted or permitting RFID signal transmission. Accordingly, a user may be able to control when signals may be transmitted by or received from the RFID tag, thereby improving security by reducing or eliminating the likelihood of unauthorized access to the data associated with the tag.

These arrangements, as well as additional details and arrangements, will be discussed more fully herein.

Figure 1A:
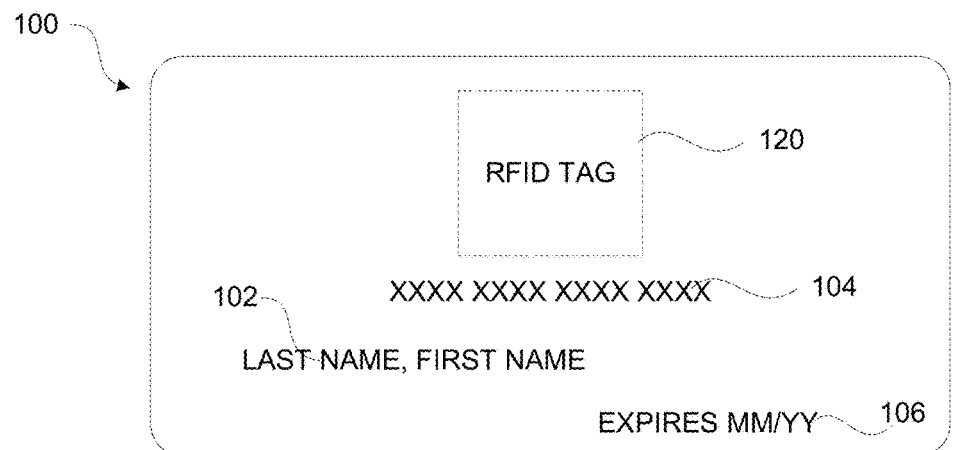
FIGS. 1A and 1B illustrate a front view and a rear view, respectively, of an example device that may be used in accordance with one or more aspects described herein.
Figure 1B:
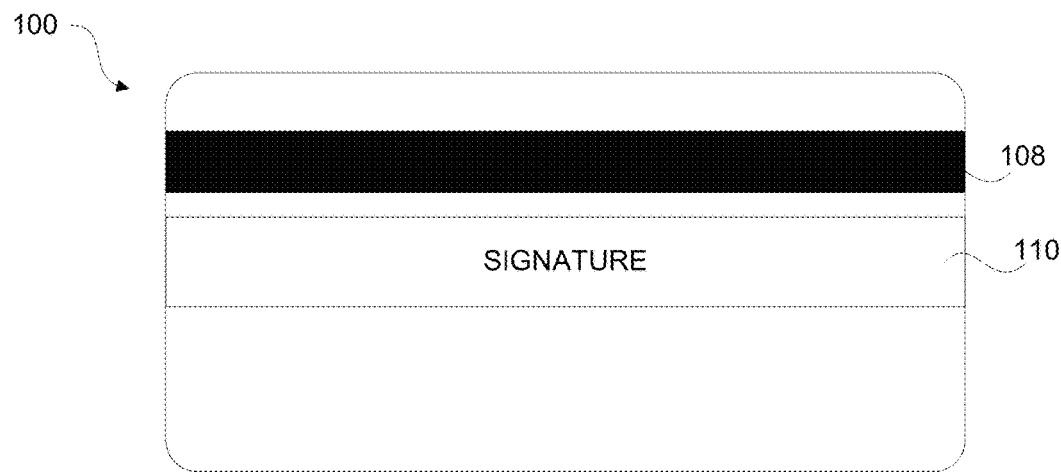

FIGS. 1A and 1B illustrate one example device that may be used in accordance with one or more aspects described herein. FIG. 1A illustrates an example front face of the device 100, while FIG. 1B illustrates an example rear or back face of the device 100. In the example of FIGS. 1A and 1B, the device 100 may be a payment card, such as a credit card, debit card, or the like. The device 100 may include a name region 102, a device or account number 104, and/or an expiration date 106. In some examples, one or more of name region 102, device or account number 104, and/or expiration date 106 may be removed from the device 100 in order to provide additional privacy and/or security.

The device 100 further includes a radio frequency identification (RFID) tag or chip 108. The RFID tag 108 may store data related to the user, an account associated with the card, and the like, and may, in some instances, transmit data to a reader in order to, for example, complete a transaction (e.g., pay for an item or service). The RFID tag may be passive (e.g., when a RFID reader is within range, the tag may be powered to transmit a signal detected by the reader) or active (e.g., the RFID tag is self-powered and continuously (or periodically) broadcasts a signal that may be detected by a reader). Although active RFID tags may have a greater range of detection than passive RFID tags, both types of tags are read by a RFID reader in order to transmit data. The arrangements described herein may be used to provide additional security for one or both types of tags. The RFID tag 108 may be embedded within the device 100 (e.g., within a generally planar portion of the device 100) such that it might not be visible on an exterior of the device 100 (e.g., as shown in FIG. 1A with the RFID tag 108 in broken lines to indicate it is not visible on the exterior of the device 100). Alternatively, the RFID tag 108 may be mounted to an exterior surface of the device 100 such that it may be visible to a user.

FIG. 1B illustrates an example image of a rear or back side of the device 100. The rear side may include a magnetic strip 108 which may contain additional data or data similar to that associated with the RFID tag (e.g., account number, user associated with the device or account, and the like). In systems in which RFID transactions are not enabled or available, in some examples, a user may swipe the device 100 such that the data is read from the magnetic strip 108 in order to conduct the transaction. Alternatively, if a RFID transaction is not enabled or available, the device may also disable the use of the magnetic strip (e.g., scramble data, or the like) in order to prevent unauthorized use. The device 100 may further include a signature region 110 in which a named user may provide her or his signature as an additional security measure. In some example arrangements, one or more of the magnetic strip 108 and/or signature region 110 may be absent from the device to provide additional security or privacy.

Although the device 100 shown in FIGS. 1A and 1B, and in other figures, the device may be a device other than a payment device that includes a RFID tag or chip. For instance, the device may be a key fob or card for gaining access to a building or space within a building, a toll collection device for collecting tolls on roadways, a sporting event timing device, a travel document (e.g., enhanced license or passport), or the like. The arrangements described herein may be used with any of these RFID enabled devices, as well as other RFID enabled devices, without departing from the invention.

Although aspects of the disclosure are described with references to RFID, one or more other forms of automatic identification and data capture may be used without departing from the invention.

As discussed above, aspects of the disclosure are directed to transferring a RFID tag from a first mode, such as an inactive state, to a second mode, such as an active state. For instance, in an inactive mode or state, the RFID tag might not be enabled to transmit a signal or other data, while in the active mode or state, the RFID tag may be enabled to transmit a signal or other data. Transferring the mode of the RFID tag may be performed via RFID tag mode or state modifiers, as will be discussed more fully below. In addition, the manner in which the RFID tag is activated or inactivated may be performed in various ways. The below-described arrangements may be used with one or more of the RFID tag mode or state modifiers discussed herein.

For example, an inactive mode of a RFID tag may include scrambled or encrypted signals or data transmitted from the RFID tag, while an active mode or state may include decrypted (or not encrypted) signals or data such that it can be accessed and/or read by a RFID reader. Stated differently, when in an inactive mode, the RFID signals may be scrambled or encrypted to prevent use of the RFID tag. When in an active mode, the scrambling may be removed or encrypted signals may be decrypted to permit use.

In another example, enabling or disabling the RFID tag for use may be performed by a physical barrier covering or enclosing the RFID tag. For instance, an inactive mode or state of the RFID tag may include an additional device (such as a flap, cover, or the like) provided to prevent or block signals and/or other data being transmitted to or from the tag. An active mode or state may include removal of the additional device blocking the signal or data to enable transmission of the signal and/or data.

In some examples, additional features may be provided upon activation or deactivation of the RFID tag to provide additional security measures. For instance, alternating frequencies may be used when the RFID tag is transferred to the active mode. For instance, activation of the RFID tag (e.g., transfer to an active mode) may cause the RFID tag to re-initialize at a different frequency each time (or different frequency for consecutive activations, or the like). This may prevent unauthorized users from locating a particular frequency being used by the RFID tag and targeting that frequency. In some examples, false frequencies may be generated when the RFID tag is not in use at a particular trusted or pre-registered entity (e.g., merchant, vendor, or the like). Further, various merchants, entities or the like may register a point-of-sale system to monitor devices for RFID signatures that might be reported lost, stolen, unauthorized use, or the like.

In some examples, a device may be restricted to use at only merchants, entities, or the like, that have been registered (e.g., registered with an entity generating the device, or the like). If the device is read at an unregistered merchant, the device may be flagged and the transaction may be considered unauthorized. In another example, detection of the device at an unregistered merchant may cause the device to be considered compromised and a replacement may be issued.

Another example additional feature may include using alternating encryption techniques when activating or deactivating the RFID tag may aid in providing additional security by randomizing the encryption being used, thereby making it more difficult or impossible for an unauthorized user to obtain data. In some examples, encryption techniques that leverage a time, date, location, or the like, of the device may be used to further protect data from unauthorized access.

These additional features may be used with one or more of the various RFID tag mode or state modifiers discussed herein.

Transferring the RFID tag from a first mode or state (e.g., an inactive state) to a second mode or state (e.g., an active state) may essentially enable use of the device. That is, if the device is in an inactive state, a reader attempting to access data via the RFID tag may be prevented from doing so and, thus, a transaction attempted via the RFID tag might not be processed or completed. Alternatively, if the device is in an active state, the RFID tag may freely transmit signals and/or data and, thus, transactions may be processed using the RFID tag or data associated therewith.

Figure 2:
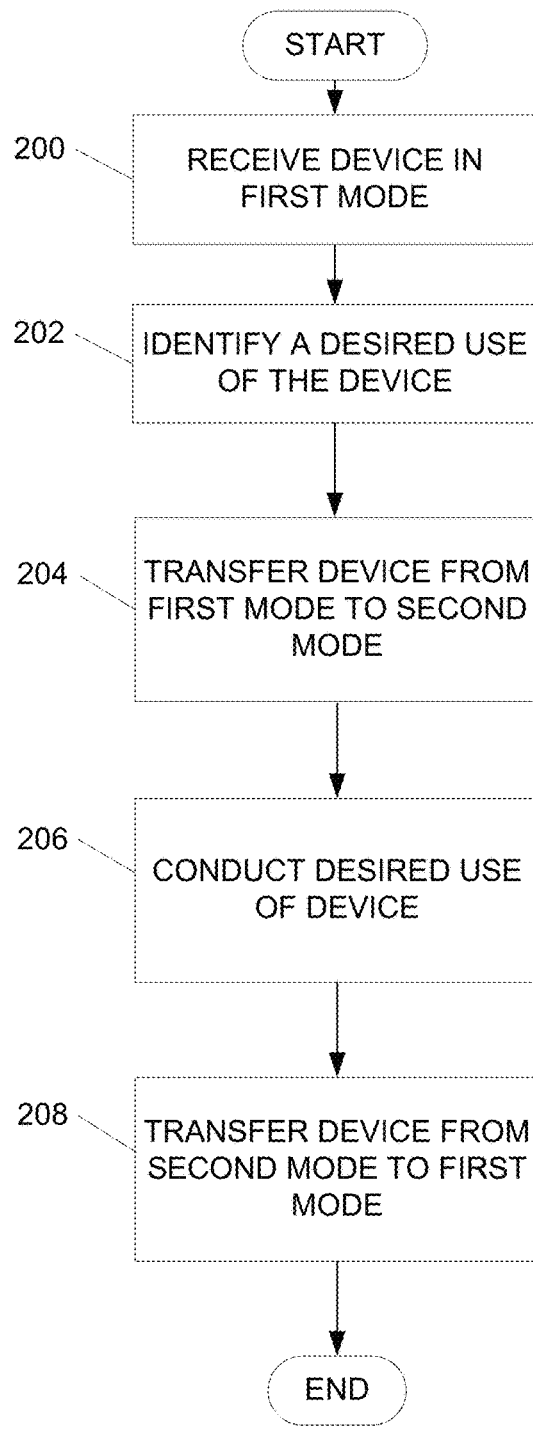
FIG. 2 illustrates one example method of transferring a device or RFID tag associated with the device from a first mode to a second mode in accordance with one or more aspects described herein.

FIG. 2 illustrates one example method of transferring a device from a first mode to a second mode according to one or more aspects described herein. As indicated above, the device may include a RFID tag and may be one of several types of devices that employ RFID technology.

In step 200, a device may be received by a user in a first mode. In some examples, the device may default to an inactive mode to increase security associated with the device (e.g., reduce the chance of an unauthorized RFID reader capturing or obtaining data from the RFID tag or device). In step 202, a desired use of the device may be identified. For instance, a user may desire to make a purchase or conduct another transaction using the device. In examples in which the device is an access pass (e.g., door pass or fob to permit access to a building, area, or the like), the desired use may include a desire for the user to access to the area. In another example in which the device is a toll payment device, the user may be travelling on a roadway and is aware of or anticipating tolls along the roadway. The desired use may be one of various other types of uses of RFID tags without departing from the invention.

In step 204, the device may be transferred from the first mode to a second mode in order to activate the RFID tag. Various examples of transferring the device from the first mode to the second mode will be discussed more fully below. In step 206, the desired use of the device may be conducted. For instance, the transaction may be processor or completed (e.g., purchase made via the RFID tag and device), the area or building may be accessed (e.g., door unlocked or opened via the RFID tag and device), toll may be paid, or the like. Upon completion of the desired use, the device may be transferred from the second mode back to the first mode in step 208.

In some examples, returning the device from the second (e.g., active) mode to the first (e.g., inactive) mode may be performed by a user in a manner similar to the manner used to transfer the RFID tag from the first mode to the second mode. In other examples, returning the device from the active mode to the inactive mode may performed automatically. For instance, upon a lapse of a predetermined amount of time, the device may automatically revert from the second mode to the first mode in order to improve or increase security of the device. In some arrangements, the predetermined amount of time may be measured from the time of transferring the RFID tag from the first mode to the second mode (e.g., if, after activating the RFID tag, the predetermined amount of time has elapsed, the RFID tag will automatically return to the inactive mode).

Figure 3:
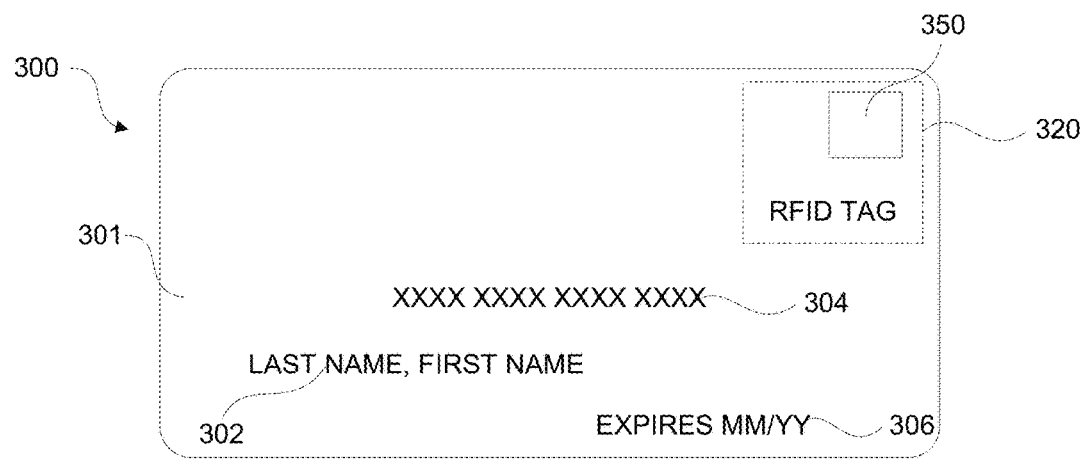
FIG. 3 illustrates one example device having a RFID tag mode or state modifier in accordance with one or more aspects described herein.
Figure 4:
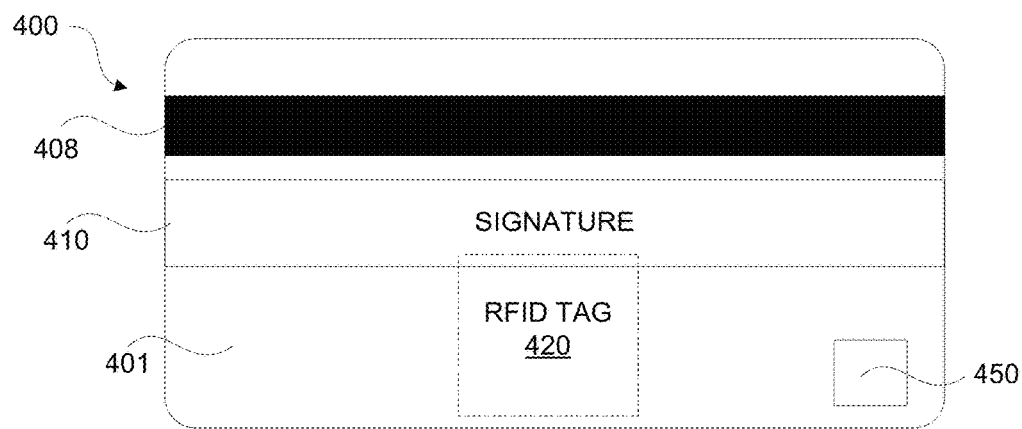
FIG. 4 illustrates another example device having a RFID tag mode or state modifier in accordance with one or more aspects described herein.

FIGS. 3 and 4 illustrate example devices having a RFID tag mode or state modifier in accordance with one or more aspects described herein. The devices 300, 400 of FIGS. 3 and 4, respectively, each include an activation button that causes the RFID tag to modify or change a mode or state (e.g., from a first state to a second state). The device 300, 400 may be a payment device or may be one of various other types of devices that implement RFID technology, as discussed herein.

With reference to FIG. 3, the device 300 may include a body portion 301 that, in the example of FIG. 3, may be a generally planar portion, as well as a name region 302, account or device number region 304, and/or expiration date region 306. As discussed above, one or more of the name 302, account number 304 and/or expiration date 306 might not be present on the device 300 in order to increase security and/or privacy during use of the device 300.

As discussed above, the device may include a RFID tag 320. The RFID tag 320 may be embedded within the generally planar portion 301 (as indicated in FIG. 3 through the use of broken lines to indicate that RFID tag 320 is hidden from view or otherwise not visible in the generally planar portion 301) or may be mounted to otherwise connected to a surface of the generally planar portion 301 such that the RFID tag 320 may be visible on a surface of the device 300.

The device 300 may further include a RFID tag mode or state modifier 350. In the example shown in FIG. 3, the RFID tag mode or state modifier may be an activation button 350 that may be depressed or otherwise selected to modify a mode or state of the RFID tag 320. For instance, the RFID tag mode or state modifier 350 may be a button that acts as a toggle switch to transfer the RFID tag 320 from a first mode to a second mode (e.g., from an inactive mode to an active mode and vice versa). Accordingly, if the RFID tag is currently in an inactive mode or state, depressing button 305 may cause transmission of a signal to activate or otherwise enable the RFID tag 320 for use. Depressing the button 350 a second time may transfer the RFID tag 320 back to the first mode (e.g., inactive state).

Although the RFID tag 320 and RFID tag mode or state modifier 350 are shown in FIG. 3 as being in a same region of the device 300, the RFID tag 320 and RFID tag mode or state modifier 350 may be located in separate regions of the device, as shown in FIG. 4.

FIG. 4 illustrates another example device 400 having a RFID tag 420 and RFID tag mode or state modifier 450 that includes an activation button (similar to button 350). Device 400 is shown in a rear view (similar to rear view of device 100 in FIG. 1B) and includes a body portion 401 that, in the example of FIG. 4, may be a generally planar region or portion.

The device 400 includes a RFID tag 420 and a RFID tag mode or state modifier 450. As shown in FIG. 4, the RFID tag 420 and RFID tag state or mode modifier are not located in a same region of the device 400. Alternatively, the tag 420 and modifier 450 may be located or arranged in a same region, as shown in FIG. 3.

Similar to the arrangement of FIG. 3, the RFID tag 420 may be embedded within the body portion 401 (as shown in FIG. 4), or may be arranged on a surface of the device 400. The device 400 further includes RFID tag mode or state modifier 450 which, in the example of FIG. 4, is arranged on a rear side of the device 400. Accordingly, the RFID tag mode or state modifier 450 (of this or any of the examples shown and described herein) may be arranged in one of various regions on the device without departing from the invention.

Similar to RFID tag mode or state modifier 320, RFID tag mode or state modifier 420 may include an activation button that acts as a toggle switch to transfer the RFID tag 420 from a first mode to a second mode and vice versa. The button 450 may be depressed to transfer the RFID tag 420 from a first mode to a second mode and depressed again to return the RFID tag 420 to the first mode, similar to the arrangement of FIG. 3. Similar to the arrangements discussed above, transferring the RFID tag between modes may include encrypting or decrypting signals, allowing or preventing transmission of signals, and the like.

Figure 5:
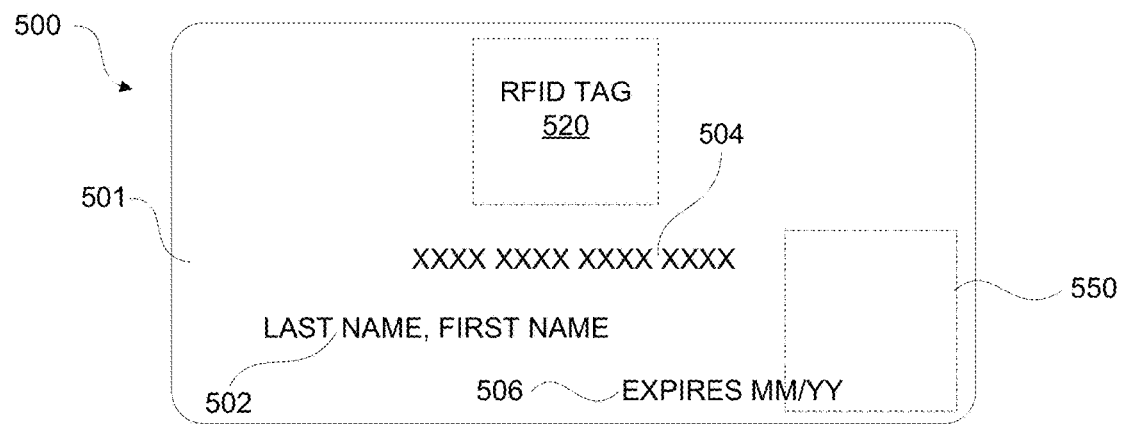
FIG. 5 illustrates yet another example device having a RFID tag mode or state modifier in accordance with one or more aspects described herein.
Figure 6:
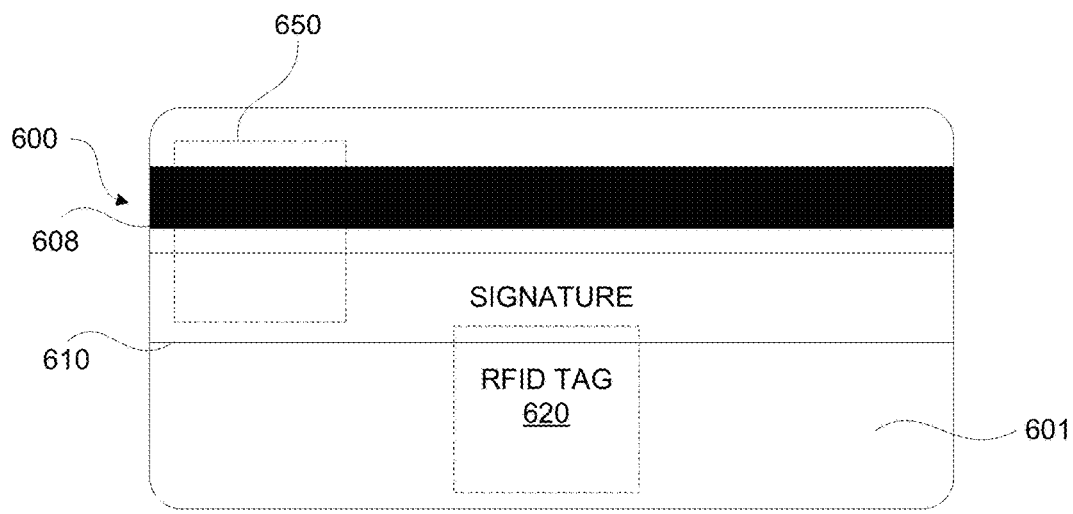
FIG. 6 illustrates still another example device having a RFID tag mode or state modifier in accordance with one or more aspects described herein.

FIGS. 5 and 6 illustrate other devices that include a RFID tag mode or state modifier in accordance with one or more aspects described herein. The device 500, 600 of FIGS. 5 and 6, respectively, each include a RFID tag mode or state modifier that includes a contact region of the device configured to detect contact (e.g., touch) of a user.

For instance, with respect to FIG. 5, the device 500 includes a body portion 501, as well as name 502, account number or card number 504, and/or expiration date 506. Similar to other arrangements described herein, one or more of name 502, number 504, and/or expiration date 506, may be omitted from the device 500, as desired.

Similar to other arrangements discussed herein, the device 500 includes a RFID tag 520. The device 500 further includes RFID tag mode or state modifier 550. In the example of FIG. 5, the RFID tag mode or state modifier 550 may be a designated (in some cases, selected) area or region on a surface of the device 500 that, when contacted by a user, may activate or deactivate the RFID tag or otherwise enable or disable the RFID tag and, thus, use of the device 500 via RFID technology.

The RFID tag mode or state modifier 550 may, as indicated above, be a region of the device 500 that may be configured to detect contact from a user. In some arrangements, contact by the user (e.g., via a fingertip, thumb, or the like) may transfer the RFID tag 520 from a first mode to a second mode (or vice versa). In some examples, the contact by the user may be for a predetermined time period (e.g., above a threshold minimum contact time period) in order to activate or deactivate the RFID tag 520 (e.g., transfer the RFID tag 520 from a first mode to a second mode, or vice versa). For instance, if a user contacts the RFID tag mode or state modifier 550 for at least two seconds, three seconds, five seconds, or the like, the RFID tag 520 may be transferred from a first mode to a second mode, or vice versa. Subsequent contact with the region 550 for a same or similar predetermined amount of time may then transfer the mode of the RFID tag 520 back to the previous mode.

In some examples, the RFID tag mode or state modifier 550 may detect contact via pressure from the user (e.g., from the finger of the user). Additionally or alternatively, the RFID tag mode or state modifier 550 may detect a pulse of a user and detection of the pulse (e.g., for a predetermined amount of time) may activate or deactivate the RFID tag 520. In still other examples, the RFID tag mode or state modifier 550 may detect other biometric data, such as a fingerprint of the user. In arrangements in which biometric information is used to activate or deactivate the RFID tag 520, the biometric data may be collected from the user prior to an initial use of the device 500, or at another selected time.

In some examples, the use of biometric data to deactivate or activate the RFID tag 520 via the RFID tag mode or state modifier 550 may provide additional security because an unauthorized user would not be able to activate or deactivate the RFID tag 520. For instance, an unauthorized user may contact the RFID tag mode or state modifier 550, however, unless the biometric data of the person contacting the modifier 550 is recognized, the RFID tag 520 may remain in a current state or more (e.g., the RFID tag 520 will not be transferred to another state or mode without recognition of the biometric data of the person attempting to use the device 500). Although the use of biometric data is described with respect to FIG. 5, aspects of the use of biometric data discussed herein may be used with any of the various RFID mode or state modifiers discussed herein (e.g., use of the activation button may be dependent upon matching biometric data of the user to that of an authorized user, or the like).

Figure 7:
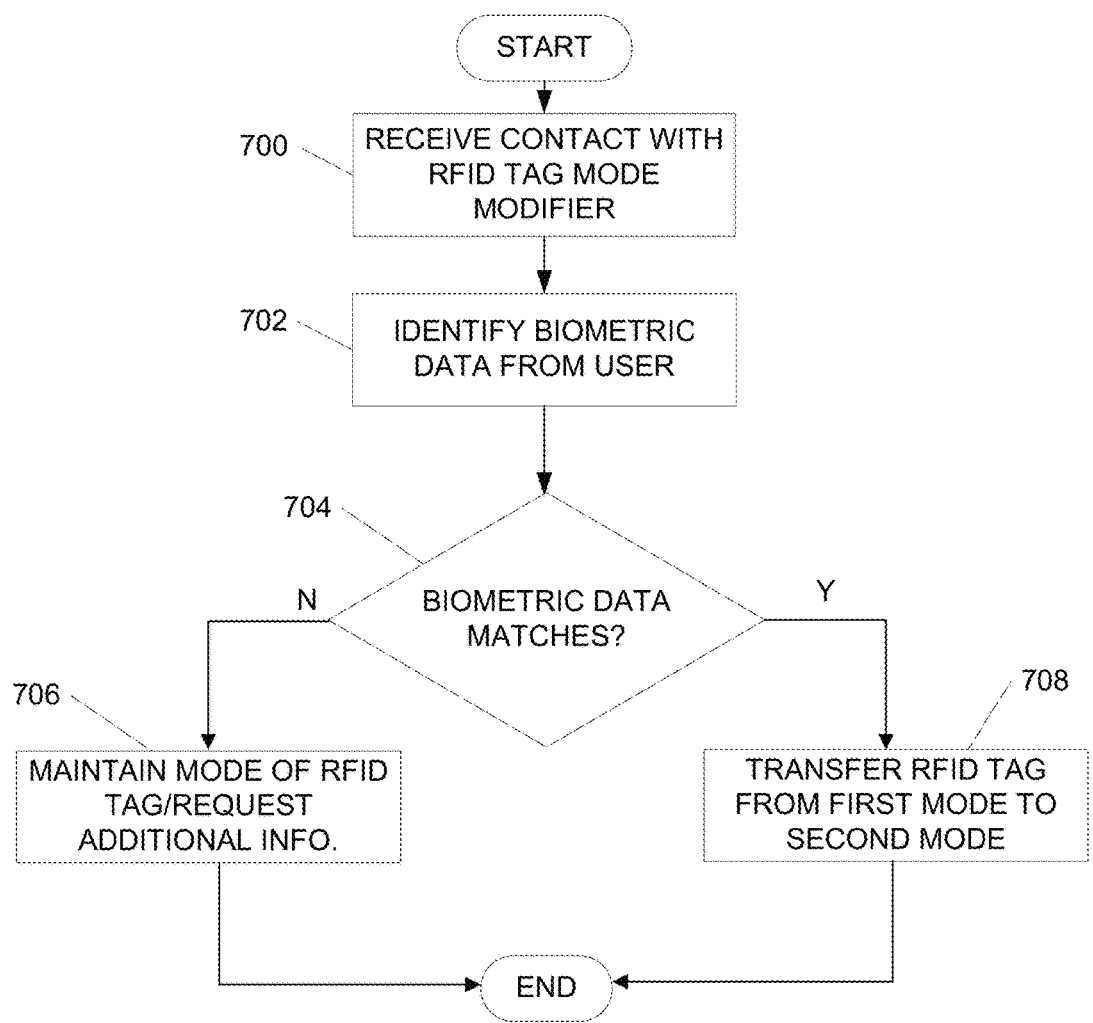
FIG. 7 illustrates one example method of receiving biometric data from a user to activate or deactivate a RFID tag according to one or more aspects described herein.

FIG. 7 illustrates one example method of receiving biometric data from a user to activate or deactivate a RFID tag according to one or more aspects described herein. In step 700, contact with an RFID tag mode or state modifier may be received. For instance, a user may contact the designated region (e.g., 550 in FIG. 5) on the device (e.g., 500 in FIG. 5) in an attempt to transfer the RFID tag (e.g., 520 in FIG. 5) from a first mode (e.g., an inactive mode or state) to a second mode (e.g., active mode or state). In step 702, biometric data from the user contacting the RFID tag mode or state modifier may be received. The biometric data may include fingerprint data, pulse information, blood flow, or the like.

In step 704, a determination may be made as to whether the received biometric data matches previously stored biometric data associated with an authorized user. For instance, prior to use of the device, one or more authorized users may provide biometric data to a system (as will be discussed more fully below) and that data may be stored (either within the system, on the device itself, or combinations thereof). The stored biometric data for the one or more authorized users is then compared to biometric data received in step 702 to determine whether a match exists in step 704.

In some examples, a threshold for what constitutes "matching" biometric data may be adjusted. For instance, one threshold may require a near perfect match of the received biometric data to the stored biometric data in order to identify the data as a match. In other examples, the threshold may be lower, such that a less perfect match may still be deemed matching data. Such arrangements may aid in situations in which the user's finger is not completely within the region 550 and thus, for example, a full fingerprint might not be obtained. A lower threshold for matching may still permit the user to activate or deactivate the RFID tag even though the data was not a full or complete match. In some example, the threshold for a match may be set by a user, while in other examples it may be determined by the system or a system administrator. Further, the threshold may vary depending on the user or, in situations in which multiple users may be authorized to use a single device, the threshold for each authorized user may be different (e.g., a parent may authorize a child to use the device but may require a higher threshold to identify a match to add additional security).

If, in step 704, it is determined that the received biometric data matches the stored data, then, in step 708, the RFID tag may be transferred from a first mode or state to a second mode or state. Alternatively, if a match is not identified in step 704, the mode of the RFID tag may be maintained in step 706. In some examples, step 706 may include a request for additional identifying information (e.g., personal identification number, or the like) in order to transfer the RFID tag to another mode. In other examples, the device may prevent the non-matching user from using RFID technology to conduct the transaction (e.g., the RFID will not enable without a match).

Similar to other arrangements described herein, the RFID tag mode or state modifier may be arranged in various positions on either a front or rear of the device. For instance, FIG. 6 illustrates a device 600 similar to device 500. In the example of FIG. 6, the RFID tag mode or state modifier 650 (such as a contact region similar to RFID tag mode or state modifier 550) is arranged on a rear side of the body 601 of the device. Various other positions of the RFID tag mode or state modifier may be used without departing from the invention.

In some examples, a user may designate or select a desired location of the RFID tag mode or state modifier. For instance, a user may desire to have the RFID tag mode or state modifier in a selected position on the device. Accordingly, if the RFID tag mode or state modifier is not identified on the device, an unauthorized user would not know the location of the RFID tag mode or state modifier and would not easily be able to activate or deactivate the RFID tag without attempting, possibly, multiple potential locations of the RFID tag mode or state modifier.

Further, the location of the contact region may be changed or modified. For instance, a user may change the location of the contact region forming the RFID tag mode or state modifier as desired. The region may be modified via a website or application associated with the device. This may further aid in preventing unauthorized access to the device or data by changing the location of the contact region to prevent unauthorized users from using the device.

In some examples, a contact region forming the RFID tag mode or state modifier may include more than one contact region. For instance, the RFID tag mode or state modifier may include a user contact two or more regions simultaneously or near simultaneously. For example, a user may contact a lower right corner on the front of the device as well as the expiration date region on the front of the device. In another example, the contact region may include an upper middle portion on the rear of the device and a region in which the last four digits of the card number are located. Various other combinations of multiple contact regions may be used without departing from the invention.

The contact regions forming the RFID tag mode or state modifier may also, in some examples, be used to invalidate the card. For instance, if a user is under duress and is being forced by an unauthorized user to use the device, the user may contact a predetermined contact region which may render the device invalid, may transmit a duress signal, or the like. Accordingly, the device would then be unusable to any user, including the authorized user and the unauthorized user.

In still other examples, if a user is under duress and is being forced to use the device by an unauthorized user, contact with one or more particular regions on the device may provide additional or different functionality. For instance, if a user is using the device under duress in a scenario where a balance in an account may be displayed (e.g., at an automated teller machine, at a point of sale device, or the like) selection of one or more particular contact regions may cause a reduced amount to be displayed, thereby misleading the unauthorized user into believe less money is available. Additionally or alternatively, selection of one or more regions on the device may cause limited functionality of the device. For example, if the user is under duress at, for example, an automated teller machine, the user may select the one or more contact regions indicating that he or she is under duress and that may limit an amount of funds that may be withdrawn via the device, thereby limiting the loss caused by the unauthorized user.

Figure 8:
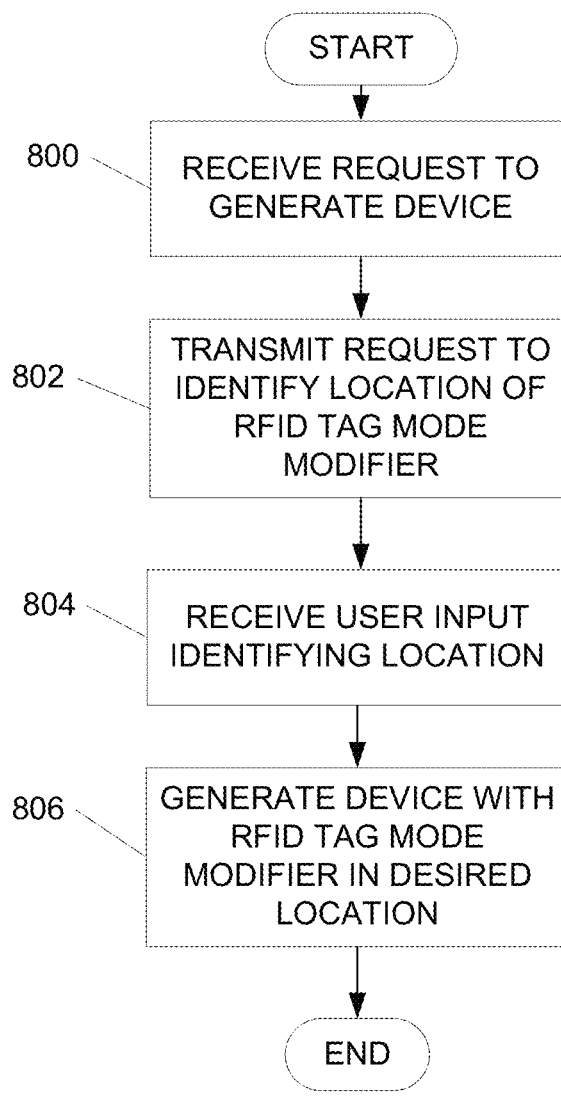
FIG. 8 illustrates one example method of selecting a region or location on a device for a RFID tag mode or state modifier according to one or more aspects described herein.

FIG. 8 illustrates one example method of selecting a region or location on a device for an RFID tag mode or state modifier according to one or more aspects described herein. In step 800, a request to generate a device may be received. The request may be for any of various types of devices described herein. In step 802, a system generating the device may transmit a request to a user (e.g., to a computing device of a user, such as a mobile device, smartphone, laptop, tablet, desktop, or the like) requesting selection of a location or position of the RFID tag mode or state modifier.

In step 804, user input may be received selecting a desired location of the RFID tag mode or state modifier. In step 806, the system may then generate the device with the RFID tag mode or state modifier arranged in the selected position. As indicated above, in some examples, a user selecting a desired location for the RFID tag mode or state modifier may provide additional security in using the device. For instance, the device might not include a visible identification of the location of the RFID tag mode or state modifier. Accordingly, only an authorized user may be aware of the location of the RFID tag mode or state modifier. An unauthorized user might not be aware that a RFID tag mode or state modifier exists on the device or may have to attempt contact with several different regions in order to modifier the RFID tag mode. Accordingly, this may aid in reducing unauthorized user of RFID enabled devices.

Figure 9A:
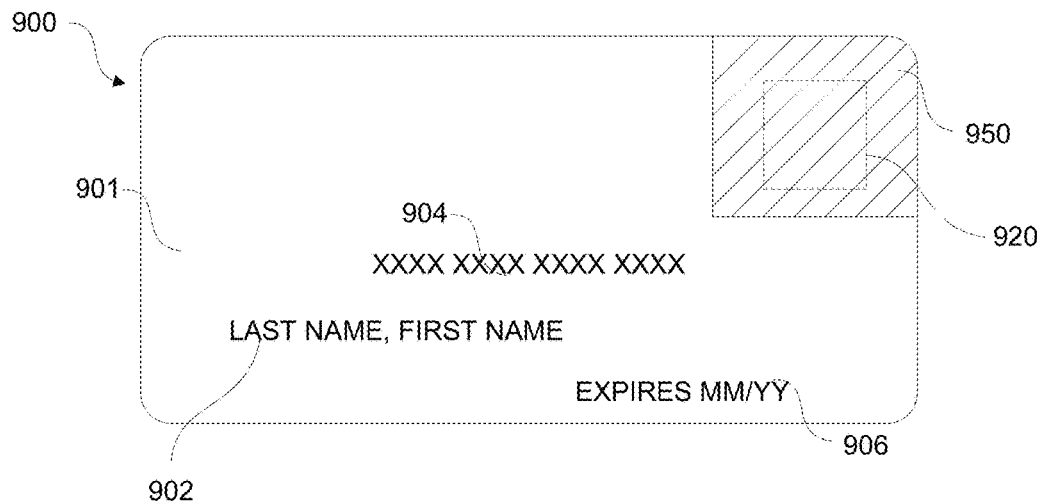
FIGS. 9A and 9B illustrate another example device having a RFID tag and a RFID tag mode or state modifier in accordance with one or more aspects described herein.
Figure 9B:
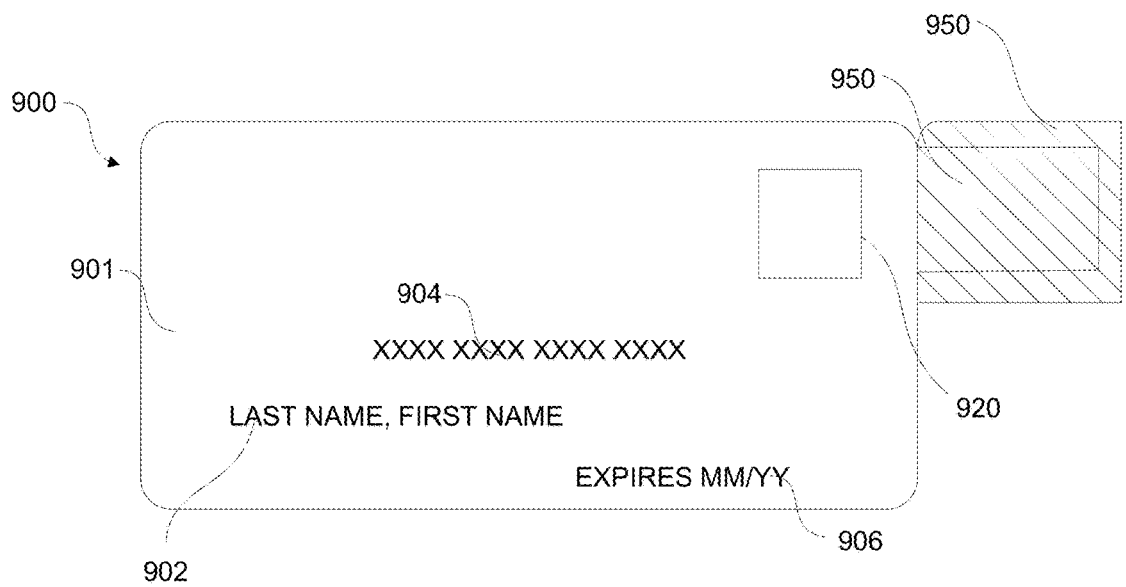

FIGS. 9A and 9B illustrate another example device having a RFID tag and a RFID tag mode or state modifier in accordance with one or more aspects described herein. Similar to other devices described herein, device 900 of FIG. 9 includes a body portion 901. Device 900 may also include name 902, account or card number 904, and/or expiration date 906 regions, one or more of which may be omitted as desired.

Device 900 further includes a RFID tag 920. The location of the RFID tag 920 on the device may vary as desired. The RFID tag 920 is shown as being visible on a surface of the device 900 (e.g., when activated or enabled, as will be discussed more fully below) but, in some arrangements, may be embedded within the body portion 901 of the device so that it might not be visible, similar to other arrangements discussed herein.

The device 900 further includes a RFID tag mode or state modifier 950. The RFID tag mode or state modifier 950 may include a flap or other portion that may be connected along one or more edges of the flap and/or device and may extend over the RFID tag 920 in some arrangements in order to prevent use of the RFID tag 920 (e.g., block any attempt to read the RFID tag 920 or for the RFID tag 920 to transmit a signal). The RFID tag mode or state modifier 950 may be a flexible material that includes signal blocking or reflecting capabilities and may be connected (either permanently connected or removably connected) to the device 900. For instance, metallic or metal-infused fabrics or foils may be used. In some examples, one or more edges or a perimeter of the RFID tag mode or state modifier 950 may include a reusable adhesive that may hold the RFID tag mode or state modifier in place over the RFID tag when the RFID tag 920 is in an inactive mode. Additionally or alternatively, one or more magnets may be used to hold the RFID tag mode or state modifier 950 in either the engaged position (e.g., FIG. 9A) or a disengaged position (e.g., FIG. 9B). In still other examples, an elastic material that may be retractable may be used. The elastic material may be securing in place across the RFID tag when the RFID tag is in an inactive mode and may retract when the RFID tag is in an active mode. In some examples, the retractable portion may include the RFID tag. Accordingly, when retracted, the RFID tag may be prevented from transmitted signals and may be in an inactive mode. When expanded, the RFID tag may be in an active mode and enabled for use. In some examples, an entity generating the device may determine activation based on expansion and retraction.

For instance, FIG. 9A illustrates the RFID tag mode or state modifier 950 covering or overlaying the RFID tag 920 (e.g., a first flap configuration). Accordingly, in this mode, the RFID tag 920 might not be enabled or active (e.g., signals may be blocked by the RFID tag mode or state modifier 950). In FIG. 9B, the RFID tag mode or state modifier 950 has been pulled away from the RFID tag 920 to expose the RFID tag 920 (e.g., a second flap configuration). Accordingly, this may permit transmission of signals to/from the RFID tag 920, thereby enabling use of the RFID tag and/or RFID functionality of the device 900. Accordingly, by covering or removing the cover from the RFID tag, the tag 920 may be transferred from a first mode to a second mode, or vice versa.

Figure 10A:
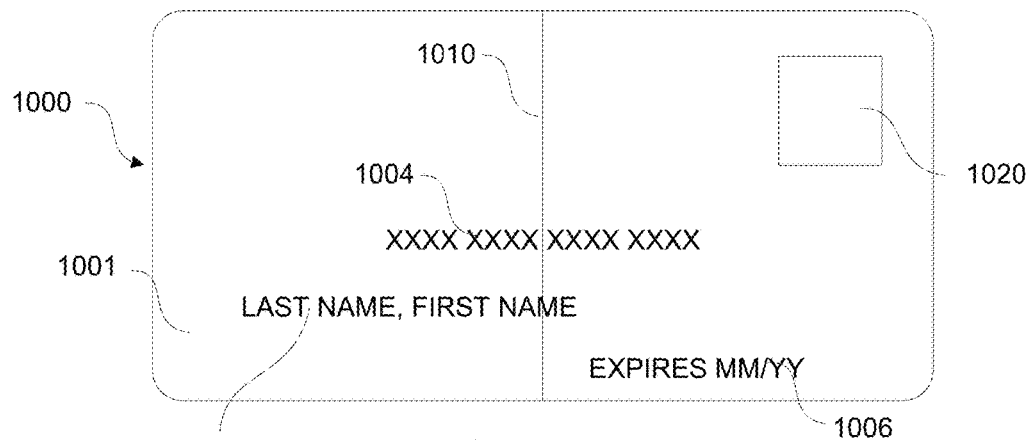
FIGS. 10A-10C illustrate yet another example device having a RFID tag and RFID tag mode or state modifier in accordance with one or more aspects described herein.
Figure 10B:
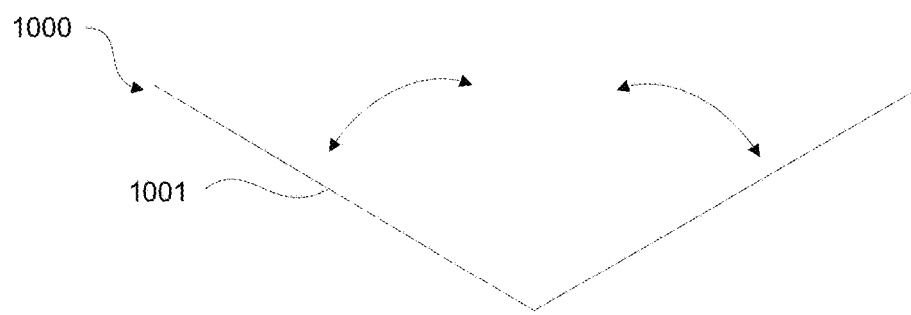
Figure 10C:
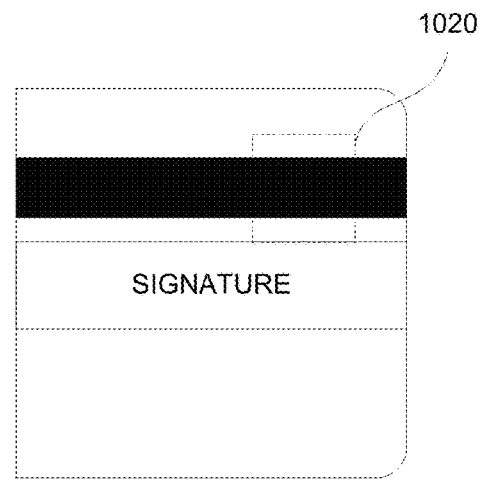

FIGS. 10A-10C illustrate another example device having a RFID tag and RFID tag mode or state modifier in accordance with one or more aspects described herein. The device 1000 shown in FIGS. 10A-10C is shown as a payment device, however it may be one of various other types of RFID devices as discussed herein. Similar to various other devices described herein, the device 1000 may include a body portion 1001. The device may also include a name 1002, account or card number 1004 and/or expiration date 1006, one or more of which may be omitted, as desired. The device 1000 may further include a RFID tag 1020 similar to RFID tags described with reference to other figures. The RFID tag 1020 may be embedded within the device 1001 or may be mounted on a surface of the device 1000 such that it is visible on the surface of the device 1001.

The device 1000 may include a seam or break line 1010 along which the device 1000 may fold (e.g., fold inward, onto itself). For instance, as shown in FIG. 10B, the device 1000 may fold generally in half such that a front surface of each half may meet, thereby obscuring or the RFID tag 1020, as shown in FIG. 10C. The body portion 1001 of the device may be formed of a material configured to block, reflect or absorb transmission of RFID signals. For instance, metallic or metal-infused fabrics or foils may be used or may be used to cover a portion of the device (e.g., the back side so that the RFID tag is enclosed within the material when the device is folded). Accordingly, when the device 1000 is folded, as shown in FIG. 10C, the RFID tag 1020 may be enclosed within the material blocking the RFID signals and, thus, may be considered in an inactive state or mode (e.g., a first mode). Alternatively, upon unfolding or opening the device 1000, the RFID tag 1020 may be exposed and signal transmission may be permitted. Accordingly, the RFID tag 1020 may be in a second mode (e.g., an active mode or state) and may be available for use.

As discussed herein, one or more computing devices and/or systems may be used with the RFID activation arrangements described herein. For instance, computing devices and systems may be used for generating a device, processing user requests, receiving biometric data of authorized users for comparisons, processing transactions, and the like. Accordingly, FIGS. 11 and 12 below provide example computing devices that may include hardware and/or software configured to perform the particular functions described herein.

Figure 11:
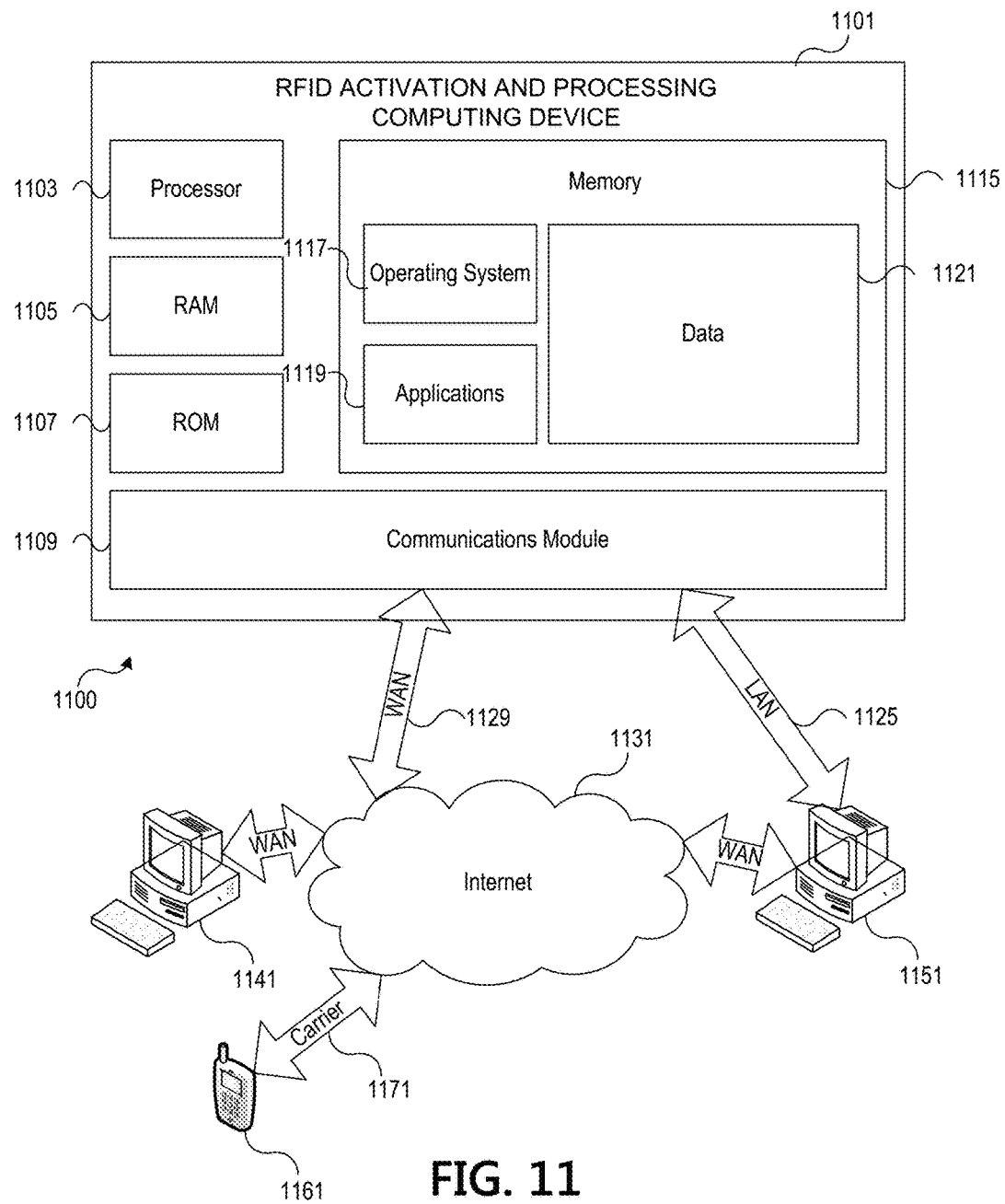
FIG. 11 illustrates one example operating environment in which various aspects of the disclosure may be implemented in accordance with one or more aspects described herein.

For instance, FIG. 11 depicts an illustrative RFID activation operating environment in which various aspects of the present disclosure may be implemented in accordance with one or more example embodiments. Referring to FIG. 11, computing system environment 1100 may be used according to one or more illustrative embodiments. Computing system environment 1100 is only one example of a suitable computing environment and various other computing environments may be suitable for use with the devices, processes and the like, described herein. Computing system environment 1100 should not be interpreted as having any dependency or requirement relating to any one or combination of components shown in illustrative computing system environment 1100.

Computing system environment 1100 may include RFID activation and processing computing device 1101 having processor 1103 for controlling overall operation of RFID activation and processing computing device 1101 and its associated components, including random-access memory (RAM) 1105, read-only memory (ROM) 1107, communications module 1109, and memory 1115. RFID activation and processing computing device 1101 may include a variety of computer readable media. Computer readable media may be any available media that may be accessed by RFID activation and processing computing device 1101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by RFID activation and processing computing device 1101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on RFID activation and processing computing device 1101. Such a processor may execute computer-executable instructions stored on a computer-readable medium.

Software may be stored within memory 1115 and/or storage to provide instructions to processor 1103 for enabling RFID activation and processing computing device 1101 to perform various functions. For example, memory 1115 may store software used by RFID activation and processing computing device 1101, such as operating system 1117, application programs 1119, and associated database 1121. Also, some or all of the computer executable instructions for RFID activation and processing computing device 1101 may be embodied in hardware or firmware. Although not shown, RAM 1105 may include one or more applications representing the application data stored in RAM 1105 while RFID activation and processing computing device 1101 is on and corresponding software applications (e.g., software tasks) are running on RFID activation and processing computing device 1101.

Communications module 1109 may include a microphone, keypad, touch screen, and/or stylus through which a user of RFID activation and processing computing device 1101 may provide input, and may also include one or more of a speaker for providing audio output and a video display device for providing textual, audiovisual and/or graphical output. Computing system environment 1100 may also include optical scanners (not shown). Exemplary usages include scanning and converting paper documents, e.g., correspondence, receipts, and the like, to digital files.

RFID activation and processing computing device 1101 may operate in a networked environment supporting connections to one or more remote computing devices, such as computing devices 1141, 1151, and 1161. Computing devices 1141, 1151, and 1161 may be personal computing devices or servers that include any or all of the elements described above relative to RFID activation and processing computing device 1101. RFID activation and processing computing device 1161 may be a mobile device (e.g., smart phone) communicating over wireless carrier channel 1171.

The network connections depicted in FIG. 11 may include local area network (LAN) 1125 and wide area network (WAN) 1129, as well as other networks. When used in a LAN networking environment, RFID activation and processing computing device 1101 may be connected to LAN 1125 through a network interface or adapter in communications module 1109. When used in a WAN networking environment, RFID activation and processing computing device 1101 may include a modem in communications module 1109 or other means for establishing communications over WAN 1129, such as Internet 1131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The RFID activation and processing computing device may be operational with or embodied in one or more types of computing devices, such as personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 12:
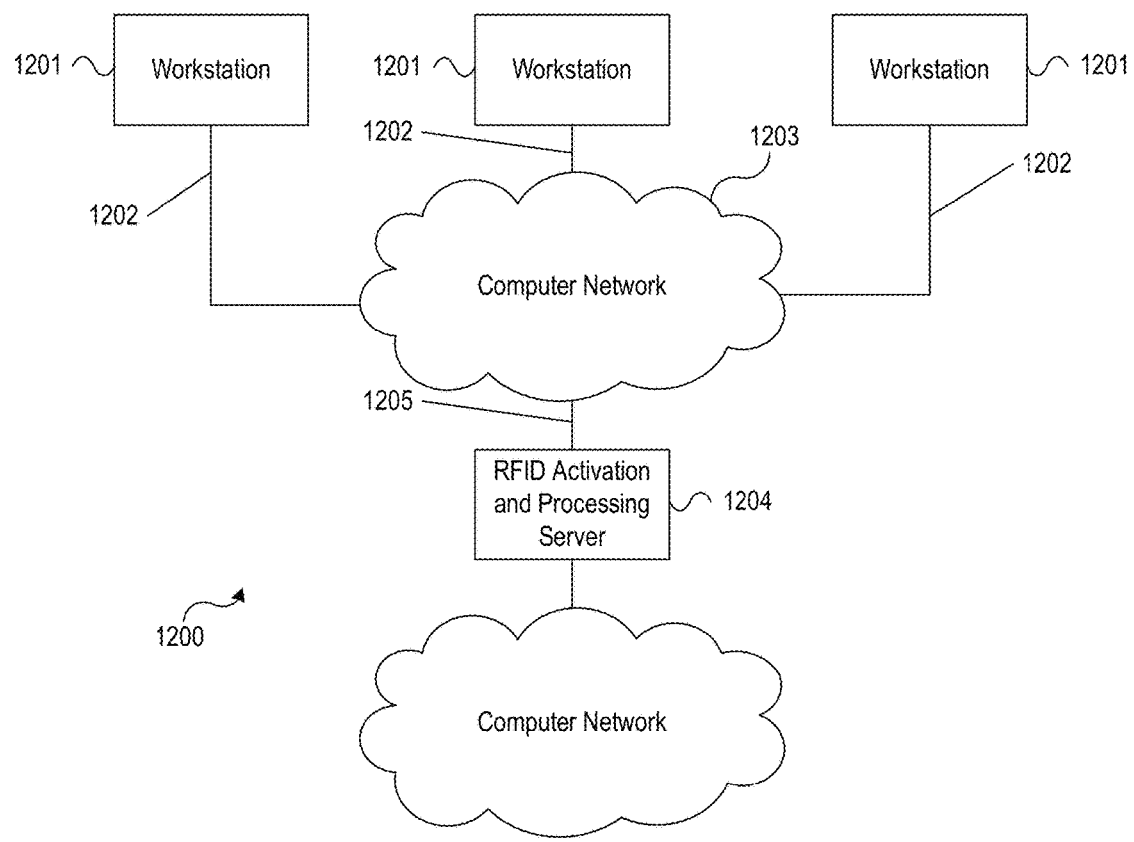
FIG. 12 depicts an illustrative block diagram of workstations and servers that may be used to implement the processes and functions of certain aspects of the present disclosure in accordance with one or more aspects described herein.

FIG. 12 depicts an illustrative block diagram of workstations and servers that may be used to implement the processes and functions of certain aspects of the present disclosure in accordance with one or more example embodiments. Referring to FIG. 12, illustrative system 1200 may be used for implementing example embodiments according to the present disclosure. As illustrated, system 1200 may include one or more workstation computers 1201. Workstation 1201 may be, for example, a desktop computer, a smartphone, a wireless device, a tablet computer, a laptop computer, and the like. Workstations 1201 may be local or remote, and may be connected by one of communications links 1202 to computer network 1203 that is linked via communications link 1205 to RFID activation and processing server 1204. In system 1200, RFID activation and processing server 1204 may be any suitable server, processor, computer, or data processing device, or combination of the same. RFID activation and processing server 1204 may be used to process the instructions received from users, generate one or more device, compare biometric data to pre-stored biometric data, and the like.

Computer network 1203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 1202 and 1205 may be any communications links suitable for communicating between workstations 1201 and RFID activation and processing server 1204, such as network links, dial-up links, wireless links, hard-wired links, as well as network types developed in the future, and the like.

As discussed above, various aspects of the devices having RFID tag mode or state modifiers discussed herein provide additional protection against unauthorized access to data via a RFID tag. In some examples, the devices may automatically default to an inactive state in order to prevent unauthorized access to data via the RFID tag. Also, as discussed above, the device may automatically revert to an inactive state upon a predefined amount of time elapsing since the device was transferred to the active state.

Further, the RFID technology and features discussed herein may be coupled with other technologies to provide further security and privacy improvements. For instance, in devices having RFID technology as well as other technology for performing functions (such as a magnetic data strip) the other technologies may also be disabled upon the RFID tag being in an inactive state. For instance, if the RFID tag is in an inactive state, the magnetic strip may also be disable to avoid unauthorized use. However, when the RFID tag is activated, the magnetic strip might also be activated. Thus, a user may complete a desired function using either technology.

In other examples, the secondary technology (e.g., the technology other than the RFID tag) may operate (e.g., be active or inactive) independently of the status of the RFID tag. Thus, if the RFID tag is in an inactive state, the magnetic strip or other technology may be available and enabled for use, in some arrangements.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers or platforms and one or more networks. The functionality may be distributed in any manner, or may be located in a single computing device (e.g., a server, a client computer, and the like). For example, in alternative embodiments, one or more of the computing devices discussed above may be combined into a single computing device, and the various functions of each computing device may be performed by the single computing device. In such arrangements, any and/or all of the above-discussed communications between computing devices may correspond to data being accessed, moved, modified, updated, and/or otherwise used by the single computing device. Additionally or alternatively, one or more of the computing devices discussed above may be implemented in one or more virtual machines that are provided by one or more physical computing devices. In such arrangements, the various functions of each computing device may be performed by the one or more virtual machines, and any and/or all of the above-discussed communications between computing devices may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A device, comprising:
a body portion formed of a generally planar portion;
a radio frequency identification (RFID) tag located in the body portion, the radio frequency identification tag having an active state in which the RFID tag is enabled for use and an inactive state in which the RFID tag is disabled; and
a RFID tag state modifier, the RFID tag state modifier formed on a portion of the body portion and configured to transfer the RFID tag from the active state to the inactive state, or vice versa, upon engagement of the RFID tag state modifier,
wherein transferring the RFID tag from the inactive state to the active state includes initializing the RFID tag at a frequency different from a frequency at which it was previously initialized.

2. The device of claim 1, wherein transferring the RFID tag from the active state to the inactive state, or vice versa, includes encrypting a RFID signal when the RFID tag is in the inactive state and decrypting the RFID signal when the RFID tag is in the active state.

3. The device of claim 1, wherein the RFID tag state modifier includes an activation toggle switch arranged on the body portion and wherein selection of the activation toggle switch transfers the RFID tag from the active state to the inactive state, or vice versa.

4. The device of claim 1, wherein the RFID tag state modifier includes a contact region formed on the body portion and wherein contact with the contact region for a predetermined time period transfers the RFID tag from the active state to the inactive state, or vice versa.

5. The device of claim 4, wherein the contact region further collects biometric data from a user contacting the contact region and determines whether the biometric data matches pre-stored biometric data prior to transferring the RFID tag from the active state to the inactive state, or vice versa.

6. The device of claim 5, wherein the biometric data includes at least one of: a fingerprint and a pulse.

7. The device of claim 4, wherein the contact region is located in a position on the body portion selected by an authorized user of the device.

8. The device of claim 1, wherein the device is one of: a payment device, an access device, and a toll collection device.

9. A method of activating or deactivating a RFID tag on a device for use, comprising:
determining a first state of the RFID tag;
receiving user input by a RFID tag state modifier on the device, the user input including a request to transfer the RFID tag from the first state to a second state;
responsive to receiving the user input, transferring the RFID tag from the first state to the second state;
determining that a predefined time period has lapsed; and
responsive to determining that the predefined time period has lapsed, automatically transferring the RFID tag from the second state to the first state, wherein the first state of the RFID tag is an inactive state in which the RFID tag is disabled for use and the second state of the RFID tag is an active state in which the RFID tag is enabled for use, and wherein transferring the RFID tag from the first state to the second state includes initializing the RFID tag at a frequency different from a frequency at which it was previously initialized.

10. The method of claim 9, wherein transferring the RFID tag from the first state to the second state includes decrypting a signal transmitted from the RFID tag and wherein transferring the RFID tag from the second state to the first state includes encrypting the signal.

11. The method of claim 9, wherein the RFID tag state modifier includes an activation toggle switch and wherein the user input includes a user depressing the activation toggle switch.

12. The method of claim 9, wherein the RFID tag state modifier includes a contact region defined on a body portion of the device and wherein the user input includes user contact with the contact region for a predetermined amount of time.

13. The method of claim 12, further including:

receiving, via the contact region, biometric data of a user;

comparing the received biometric data to pre-stored biometric data of one or more authorized users to determine whether the user is an authorized user;

responsive to determining that the user is an authorized user, transferring the RFID tag from the first state to the second state; and responsive to determining that the user is not an authorized user, maintaining the RFID tag in the first state.

14. The method of claim 9, further including:

prior to determining that a predefined time period has lapsed, receiving second user input requesting transfer of the RFID tag from the second state to the first state; and transferring the RFID tag from the second state to the first state.

15. The method of claim 9, wherein the device is one of: a payment device, an access device, and a toll collection device.

* * * * *